United States Patent [19]

Kang et al.

[11] Patent Number: 5,498,398
[45] Date of Patent: Mar. 12, 1996

[54] METHOD OF TREATING SPENT ELECTROLYTIC SOLUTION FROM ELECTROLYTIC COPPER PRODUCTION

[75] Inventors: Seong W. Kang; Yong H. Lee, both of Kyungsangnam-do, Rep. of Korea

[73] Assignee: Lucky Metals Corporation, Rep. of Korea

[21] Appl. No.: 334,245

[22] Filed: Nov. 4, 1994

[30] Foreign Application Priority Data

Nov. 8, 1993 [KR] Rep. of Korea ............. 23619

[51] Int. Cl.$^6$ ........................... C01G 3/12
[52] U.S. Cl. .................. 423/37; 423/48; 423/87; 423/146
[58] Field of Search ............ 204/DIG. 13, 106, 204/108; 423/48, 87, 37, 146

[56] References Cited

U.S. PATENT DOCUMENTS

| | | | |
|---|---|---|---|
| 1,148,522 | 8/1915 | Martin | 204/108 |
| 2,742,415 | 4/1956 | Lawrence | 204/108 |
| 3,218,161 | 11/1965 | Kunda | 423/22 |
| 3,917,519 | 11/1975 | Fisher | 204/108 |
| 4,404,071 | 9/1983 | Abe | 204/108 |
| 4,468,302 | 8/1984 | Parker | 204/108 |

Primary Examiner—John Niebling
Assistant Examiner—Brendan Mee
Attorney, Agent, or Firm—Merchant, Gould, Smith, Edell, Welter & Schmidt

[57] ABSTRACT

Disclosed herein is a method for treating a spent copper-refining electrolyte to remove impurities such as copper (Cu), arsenic (As), antimony (Sb), bismuth (Bi), nickel (Ni) and the like by using a hydrogen sulfide gas. The method comprises the steps of: (a) blowing a hydrogen sulfide gas into the spent electrolyte to precipitate copper sulfide (CuS); (b) blowing air into the coprecipitates solution obtained in the above step (a) to oxidize arsenic, bismuth and antimony thereby redissolving them into the solution, and the solution is subjected to solid-liquid separation to separate copper sulfide from the liquid; (c) blowing a sulfur dioxide gas into the copper-depleted liquid to reduce arsenic, bismuth and antimony and blowing a nitrogen gas to purge the remaining sulfur dioxide gas; (d) blowing a hydrogen sulfide gas to precipitate arsenic, bismuth and antimony in the form of sulfides and blowing a nitrogen gas to purge the remaining hydrogen sulfide gas and separating arsenic sulfide ($As_2S_3$) from the liquid; and (e) concentrating the liquid to separate crude nickel sulfate ($NiSO_4$) and sulfuric acid ($H_2SO_4$).

5 Claims, 3 Drawing Sheets

METHOD OF TREATING SPENT ELECTROLYTIC SOLUTION FROM ELECTROLYTIC COPPER PRODUCTION

BACKGROUND OF THE INVENTION

1. Field of the Invention

The present invention relates to a method of treating spent electrolyte produced from electrolytic copper production to remove copper, arsenic, antimony, bismuth, nickel and the like therefrom.

2. Description of the Prior Art

In a general refining of copper concentrate, the copper concentrate is smelted within a series of furnaces to give an intermediate matte, which is then treated in a converting furnace to give a blister copper. The blister copper is purified in a purification furnace to remove sulfur and oxygen. Since thus purified crude copper still contains impurities and valuable metals, it is further purified by electro refining to give a pure copper, which is called as an electrolytic copper. The refining has an advantage that a removal of impurities and recovery of valuable metals are easy.

In electro refining of copper wherein a solution of copper sulfate containing a large amount of free sulfuric acid is served as an electrolyte, a plate of crude copper containing impurities is served as an anode, and a seed plate of pure copper is served as a cathode, copper is dissolved at the anode and deposited onto the cathode with a purity of 99.99% or more.

When copper is dissolved, various impurities such as arsenic, nickel, antimony, bismuth and the like are also dissolved and accumulated in the electrolyte, resulting in a deterioration of the pure copper quality and a significant decrease in a current efficiency. Accordingly, it is required that a part of the electrolyte is periodically taken from the cell and purified to remove impurities so as to maintain the concentration of impurities below a certain level.

One common method for carrying out such purification of spent electrolyte is an electro winning, wherein the spent electrolyte is electrolyzed by using a copper as a cathode and insoluble lead as an anode to deposit copper and arsenic contained in the solution onto the copper cathode.

However, the method has some disadvantage that since arsenic deposits containing a large amount of copper and arsenic is formed as a by-product, retreatment is unavoidable to recover copper values therefrom and a toxic gas is generated during operation to cause an environmental pollution.

Therefore, there have been attempts to provide a new method of treating a spent copper-refining electrolyte with a low installation and operation costs without problems of a formation of arsenic deposits and a pollution.

For example, U.S. Pat. No. 4,404,071 discloses a method for treating spent electrolyte by using a hydrogen sulfide gas. The method comprises the steps of: pre-treating the spent electrolyte from the cell to remove copper until the copper content is 5–20 g/l, blowing a hydrogen sulfide gas into the pre-treated solution to precipitate metal ions including copper, arsenic, antimony and bismuth in the form of sulfides. The filtrate is returned to the cell and the precipitated sulfide is retreated in the smelting process.

However, this method has disadvantages that if the spent electrolyte contains a large amount of nickel, which is not removed by a hydrogen sulfide gas, the filtrate can not be returned to the electrolytic cell as well as the arsenic, antimony and bismuth precipitates as sulfides are returned along with copper to and recycled in the smelting process. The higher the concentration of impurities in the spent electrolytic solution is, the worse the problem is.

Accordingly, there has been a need to develop an effective method for thoroughly removing impurities from the electrolysis in the copper smelting industry.

SUMMARY OF THE INVENTION

Thus, an object of the invention is to provide a method for treating a spent copper-refining electrolyte to remove impurities such as copper (Cu), arsenic (As), antimony (Sb), bismuth (Bi), nickel (Ni) and the like by using a hydrogen sulfide gas, characterized in that which comprises the steps of:

(a) blowing a hydrogen sulfide gas into the spent electrolyte to precipitate copper sulfide (CuS). However, at this time some of the impurities are co-precipitated with copper sulfide unexpectedly;

(b) blowing air into the co-precipitate solution obtained in the above step (a) to oxidize most impurities, such as arsenic, bismuth and antimony thereby redissolving them into the solution, and the solution is subjected to solid-liquid separation to separate copper sulfide from the liquid;

(c) blowing a sulfur dioxide gas into the copper-depleted liquid to reduce all of impurities, such as bismuth and antimony and blowing a nitrogen gas to purge the remaining sulfurous acid gas;

(d) blowing a hydrogen sulfide gas to precipitate arsenic, bismuth and antimony in the form of sulfides and blowing a nitrogen gas to purge the remaining hydrogen sulfide gas and separating arsenic sulfide ($As_2S_3$) from the liquid; and (e) concentrating the liquid to separate crude nickel sulfate ($NiSO_4$) and sulfuric acid ($H_2SO_4$).

Other objects and applications of the present invention shall be apparent to those skilled in the art from the following detailed description of the invention.

DETAILED DESCRIPTION OF THE INVENTION

Figure 1:
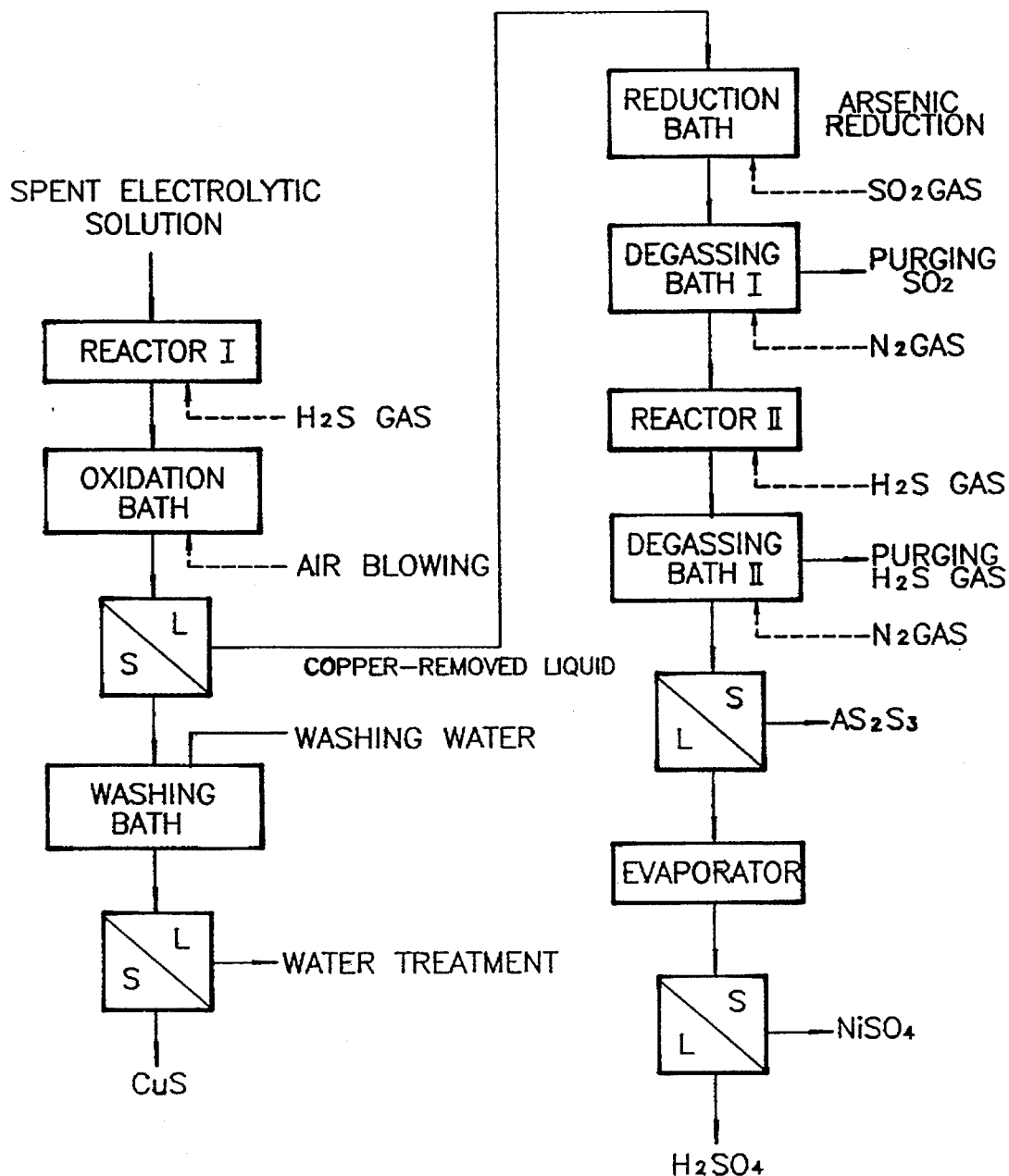
FIG. 1 is a flow chart showing the method of the present invention.

To facilitate an understanding of the method of the instant invention, a reference to FIG. 1, which shows a flow chart of the process, is made.

As shown in FIG. 1, according to the present invention, a hydrogen sulfide gas is blown into the spent electrolyte taken from the cell to precipitate copper as a sulfide to the final copper concentration of 1–2 g/l (step (a): in the reactor I).

Some of the impurities precipitated with copper sulfide in the step (a) are thoroughly dissolved into the solution by oxidizing them with aeration at high temperature.

Thus, treated solution was subjected to a solid-liquid separation to give copper sulfide, which is then washed to remove free sulfuric acid and arsenic and then the concentration of arsenic in the copper sulfide cake is less than 0.7% (step (b)). Thus, removed copper sulfide is combined with a copper concentrate and returned to the smelting process.

Arsenic contained in the remaining liquid (referred to as "copper-removed liquid") is subjected to reduction by blowing a sulfur dioxide gas into the copper-depleted liquid in the reduction bath, and the remaining sulfur dioxide gas is purged by blowing nitrogen gas (step (c)).

Then, the copper-depleted liquid is treated in the reactor II by blowing a hydrogen sulfide gas to precipitate arsenic, antimony and bismuth in the form of sulfides and the remaining hydrogen sulfide gas is purged by blowing nitrogen gas and then the precipitated sulfides of arsenic, antimony and bismuth are removed (step (d)).

The isolated arsenic sulfide is employed for preparing a high purity arsenic metal or arsenious acid.

The copper plus arsenic-removed liquid is treated to remove (step e). Thus, it is concentrated in an evaporator to give nickel sulfate ($NiSO_4$) and sulfuric acid ($H_2SO_4$). The sulfuric acid is reused to adjust the concentration of sulfuric acid in the cell and nickel sulfate is employed for producing a nickel plating solution. The present invention will be described in more detail by way of non-limiting Example.

Example

Removal of copper

In this step (a), copper contained in the spent electrolyte is precipitated as a sulfide.

1000 ml of spent electrolyte was placed into a glass reactor and maintained at 60° C. A hydrogen sulfide gas was blown thereto under stirring with a magnetic bar.

Figure 2:
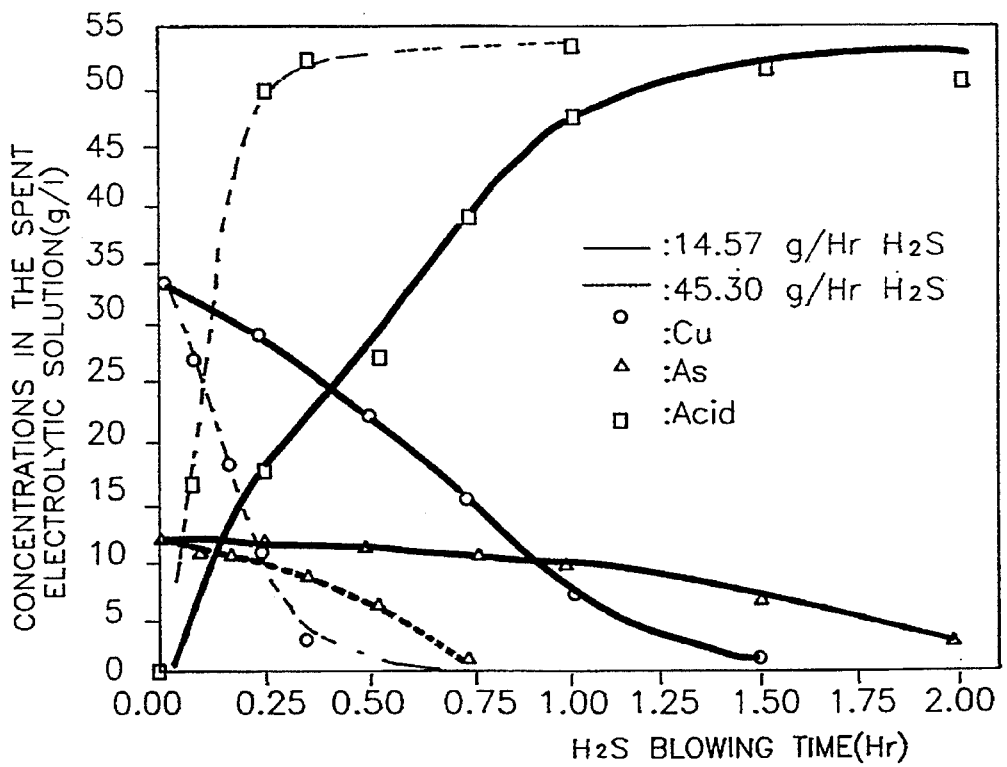
FIG. 2 is a graph showing concentrations of copper, arsenic and sulfuric acid in the spent electrolyte depending on the hydrogen sulfide gas blowing time in the step (a).

The concentrations of copper, arsenic and sulfuric acid are measured according to gas blowing time, shown in Table 1 and FIG. 2.

According to the results in FIG. 2, the concentration of sulfuric acid increases in proportion to the hydrogen sulfide blowing time whereas the concentrations of copper and arsenic decrease. At a certain time when most of copper is removed from the solution, the concentration of arsenic abruptly decreases. This phenomenon is more drastic when the gas flow rate is higher. Accordingly, the blowing of hydrogen sulfide should be stopped when the most of copper is removed from the solution in order to prevent a large amount of arsenic from being co-precipitated with copper.

The concentration of copper in the solution preferably is less than 1 g/l. The co-precipitated arsenic is oxidized in the oxidation bath to dissolve into the solution.

TABLE 1

| Gas Flow Rate (g/hr) | Comp. | Time (Min) | | | | | | | | |
|---|---|---|---|---|---|---|---|---|---|---|
| | | 5 | 10 | 15 | 20 | 30 | 45 | 60 | 90 | 120 |
| 14.6 | Cu | | | 28.47 | | 21.56 | 14.5 | 6.55 | 1.49 | 0.05 |
| | As | | | 11.23 | | 10.3 | 10.13 | 9.18 | 6.75 | 1.54 |
| | $H_2SO_4$ | | | 209.2 | | 218.0 | 229.0 | 239.0 | 243.0 | 242.1 |
| 45.3 | Cu | 26.62 | 18.23 | 9.96 | 2.51 | 0.1 | t | t | | |
| | As | 10.97 | 10.86 | 10.17 | 9.15 | 7.32 | 0.652 | 0.105 | | |
| | $H_2SO_4$ | 207.2 | 220.0 | 241.1 | 243.5 | 241.5 | 243.0 | 244.8 | | | unit: g/l
"t" means less than 1 ppm

In FIG. 2, the concentration of sulfuric acid indicates a value from which the initial concentration of sulfuric acid, 191.5 g/l is subtracted.

The starting spent electrolyte (1000 ml) contains 34.5 g/l of copper, 11.95 g/l of arsenic and 191.5 g/l of sulfuric acid.

Oxidization of arsenic

In this step, the impurities such as arsenic, antimony, bismuth and the like which are co-precipitated with copper sulfide are oxidized to dissolve into the solution.

1000 ml of spent electrolyte was heated to 60° C. and a hydrogen sulfide gas was blown thereto at a flow rate of 45.3 g/Hr for 30 minutes to completely precipitate copper (in the reactor I). Then, the solution was heated to and maintained at 80° C. and air was blown (in the oxidization bath).

The same procedure was repeated by changing the air blowing time 9 Hr, 4 Hr or 2 Hr at a constant flow rate of 300 l/Hr.

In every experiments, after filtration, the filtrated cake was washed with water, dried and examined for the content of copper sulfide. The results are shown in Table 2 and FIG. 3.

Figure 3:
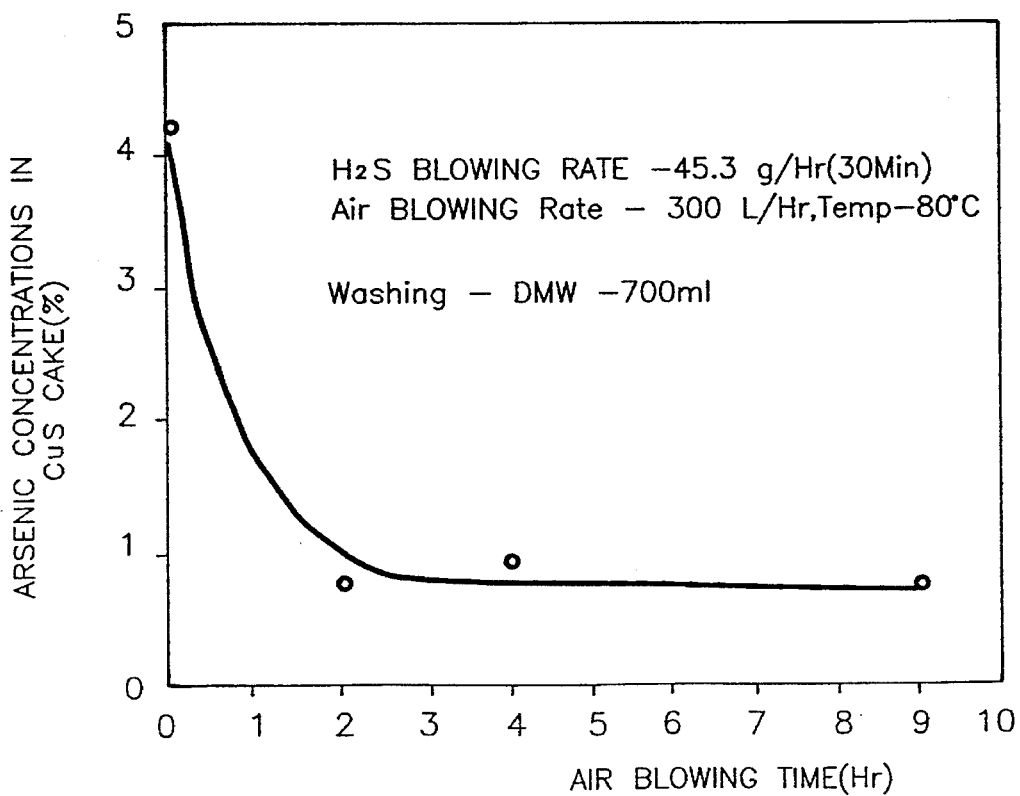
FIG. 3 is a graph showing a concentration of arsenic in the copper sulfide depending on the air blowing time in the step (b).

As can be seen from FIG. 3, the concentration of arsenic in the copper sulfide is 4.23% before blowing the air while it decreases to about 0.7% after blowing the air at a flow rate of 300 l/Hr for about 2 hours. Copper sulfide containing a such amount of arsenic can be recycled to the smelting process.

TABLE 2

| Component | Air Blowing Time (Hr) | | | |
|---|---|---|---|---|
| | 0 | 2 | 4 | 9 |
| As | 4.23 | 0.721 | 0.926 | 0.675 |
| Cu | 52.5 | 58.83 | 58.89 | 59.45 |
| $H_2SO_4$ | 28.59 | 30.58 | 30.01 | 37.76 | unit: %

The starting spent electrolyte (1000 ml) contains 34.5 g/l of copper, 11.95 g/l of arsenic and 191.5 g/l of sulfuric acid.

Conditions in the reactor I: Temperature 60° C., Hydrogen sulfide gas flow rate 45.3 g/Hr, Time 30 minutes.

Conditions in the oxidization bath: Air flow rate 300 l/Hr, Temperature 80° C.

Conditions of washing: Water 700 ml

Separation of arsenic, antimony and bismuth 1000 ml of the copper-depleted liquid obtained in the previous step was placed in a glass reactor (reduction bath) and a sulfur dioxide gas was blown thereto to reduce arsenic contained in the liquid. After this, a nitrogen gas was blown to purge the remaining sulfur dioxide gas.

Figure 4:
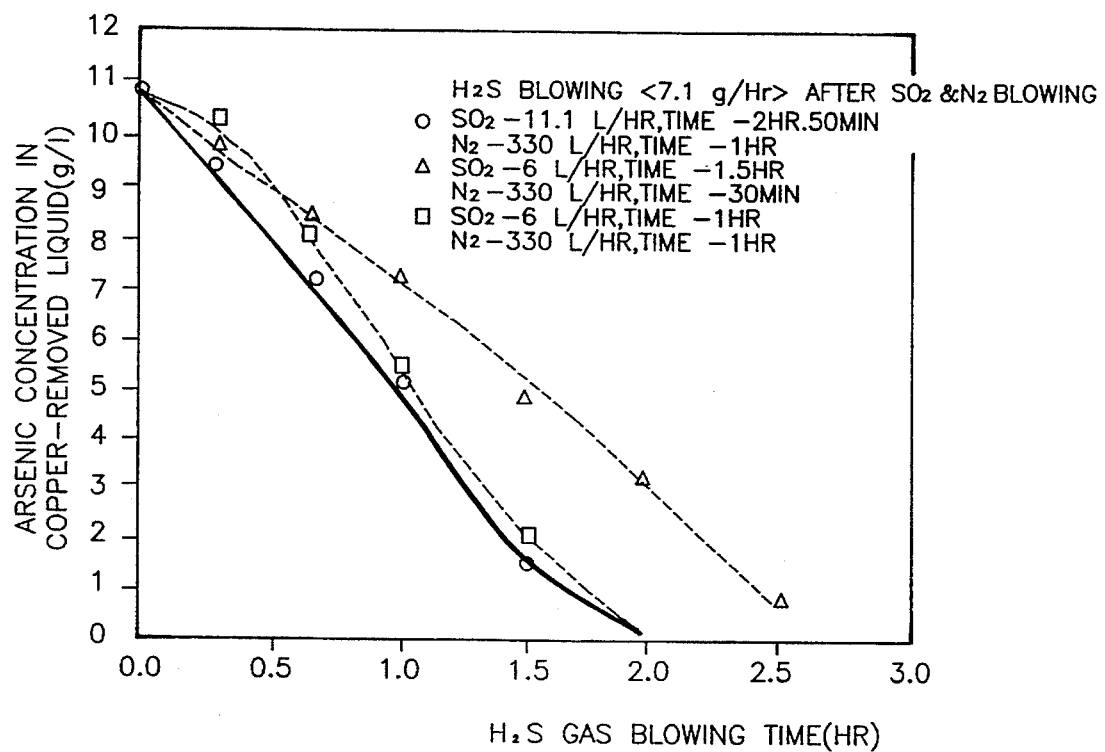
FIG. 4 is a graph showing a concentration of arsenic in the copper-depleted liquid depending on the hydrogen sulfide gas blowing time in the step (d).

Then, in the reactor II, a hydrogen sulfide gas was blown to precipitate arsenic, antimony, bismuth and the like impurities. Three experiments were carried out by changing the flow rates and blowing times of the $SO_2$ and $N_2$ gases as shown in FIG. 4. The results are shown in Table 3 and FIG. 4.

According to FIG. 4, it is understood that it is important to blow a sufficient amount of $N_2$ gas to thoroughly purge the $SO_2$ gas from the results of cases II and III. However, an excess blowing of $SO_2$ gas is not good (case I) and the $SO_2$ gas is preferably blown at a flow rate of 6 l/HR for about 1 hour.

TABLE 3

| Case | 0 | 10 Min | 40 Min | 1 HR | 1.5 HR | 2 HR | 2.5 HR |
|---|---|---|---|---|---|---|---|
| Case I | 10.99 | 9.32 | 7.28 | 5.12 | 1.48 | 0.077 | — |
| Case II (Triangle) | 10.99 | 9.77 | 8.26 | 7.10 | 4.77 | 3.26 | 0.73 |
| Case III (Rectangular) | 10.99 | 10.09 | 7.99 | 5.45 | 1.89 | 0.083 | — | unit: g/l

The copper-depleted liquid (1000 ml) contains 0.18 g/l of copper, 10.99 g/l of arsenic and 242 g/l of sulfuric acid. Hydrogen sulfide gas blowing rate is 7.1 g/Hr.

Separation of Nickel

The copper plus arsenic-removed liquid, from which copper and arsenic as well as antimony and bismuth are removed, contained only an impurity nickel and was evaporated and concentrated to precipitate nickel.

The liquid having the composition as shown in the following Table 4 was evaporated and concentrated to the sulfuric acid concentration of 1010 g/l to give a crude sulfuric acid and nickel sulfate.

TABLE 4

| | Cu | As | Sb | Bi | Ni | $H_2SO_4$ |
|---|---|---|---|---|---|---|
| Copper + Arsenic removed liquid | <0.001 | <0.001 | <0.001 | 0.004 | 7.37 | 261 |
| Crude $H_2SO_4$ | <0.1 | <0.1 | <0.1 | 0.02 | 4.61 | 1010 |
| Crude $NiSO_4$ | t | t | t | t | 10.12 | — | unit: g/l
"t" means less than 1 ppm

Overall process

Based on the results obtained in the previous experiments, optimum conditions are defined for 1000 ml of spent electrolyte as shown in Table 5 and the results therefrom are shown in Table 6.

TABLE 5

| Conditions | Reactor I | Oxidation bath | Reduction bath | Degassing bath I |
|---|---|---|---|---|
| Main Flow | 1,000 ml | 1,000 ml | 750 ml | 750 ml |
| Sub-Reactant | $H_2S$-45.3 g/HR | Air-300 L/HR | $SO_2$-6 L/HR | $N_2$-330 L/HR |
| Time | 30 Min | 2 HR | 1 HR | 1 HR |
| Temperature (C.°) | 60 | 80 | 70 | 60 |

| Conditions | Reactor II | Degassing bath II |
|---|---|---|
| Main Flow | 750 ml | 750 ml |
| Sub-Reactant | $H_2S$-7.1 g/HR | $N_2$-330 L/HR |
| Time | 2 HR | 1 HR |
| Temperature (C.°) | 30 | 26 |

TABLE 6

| | Cu | As | Sb | Bi | Ni | $H_2SO_4$ (S) |
|---|---|---|---|---|---|---|
| Spent electrolytic solution | 34.5 | 11.9 | 0.27 | 0.19 | 7.2 | 192 |
| CuS Cake (%) | 60.5 | 0.68 | 0.06 | 0.04 | 0.04 | 37.8 |
| CuS-washing water | 0.67 | 1.95 | 0.0086 | 0.124 | 1.29 | 43.6 |
| AsS (%) | 1.6 | 12.7 | 0.28 | 0.19 | 0.91 | 30.1 |
| Crude $H_2SO_4$ | t | t | t | t | 4.65 | 1007 |
| Crude $NiSO_4$ (%) | t | t | t | t | 10.1 | — |
| Recovery (%) | 95 | 84 | 82 | 80 | 63 | — | unit: g/l
"t" means less than 1 ppm

What is claimed is:

1. A method for treating a spent copper-refining electrolyte to remove impurities including copper, arsenic, antimony, bismuth, and nickel by using a hydrogen sulfide gas, characterized in that which comprises the steps of:

(a) blowing a hydrogen sulfide gas into the spent electrolyte to precipitate copper sulfide;

(b) blowing air into the precipitate solution obtained in the above step (a) to oxidize arsenic, bismuth and antimony thereby redissolving them into the solution, and subjecting the solution to solid-liquid separation to separate copper sulfide from the liquid;

(c) blowing a sulfur dioxide gas ($SO_2$) into the copper-depleted liquid to reduce arsenic, bismuth and antimony and blowing a nitrogen gas to purge the remaining sulfur dioxide gas;

(d) blowing a hydrogen sulfide gas to precipitate arsenic, bismuth and antimony in the form of sulfides and blowing a nitrogen gas to purge the remaining hydrogen sulfide gas and separating arsenic sulfide from the liquid; and (e) concentrating the liquid to separate crude nickel sulfate and sulfuric acid.

2. A method as claimed in claim 1 including ceasing to blow hydrogen sulfide gas into the spent electrolytic solution where the concentration of copper in the solution is less than about 1 g/l.

3. A method as claimed in claim 1 including treating the arsenic sulfide to obtain at least one of arsenic metal or arsenious acid.

4. A method as claimed in claim 1 including treating the nickel sulfate to produce a nickel plating solution.

5. A method as claimed in claim 1 including a step of selectively heating the solution during at least one of the processing steps of (a) through (e).

* * * * *

UNITED STATES PATENT AND TRADEMARK OFFICE
CERTIFICATE OF CORRECTION

PATENT NO. : 5,498,398

DATED : March 12, 1996

Page 1 of 2

INVENTOR(S) : Kang et al

It is certified that error appears in the above-identified patent and that said Letters Patent is hereby corrected as shown below:

Column 3, on line 50, delete "copper" and insert --Copper--.

Column 4, on line 30, delete "arsenic" and insert --Arsenic--.

Column 4, line 44, delete "experiments" and insert --experiment--.

Column 4, lines 52 and 53, delete "a such amount" and insert --such an amount--.

UNITED STATES PATENT AND TRADEMARK OFFICE
CERTIFICATE OF CORRECTION

PATENT NO. : 5,498,398
DATED : March 12, 1996
INVENTOR(S) : Kang et al

It is certified that error appears in the above-indentified patent and that said Letters Patent is hereby corrected as shown below:

Column 5, line 1, delete "Hydrogen" and insert --hydrogen--.

Column 5, in the Heading on line 9, delete "arsenic, antimony, and bismuth" and insert --Arsenic, Antimony, and Bismuth--.

Column 6, in the Heading on line 1, delete "process" and insert --Process--.

Column 6, line 16, delete "(C.°)" and insert --(°C.)--.

Column 6, line 22, delete "(C.°)" and insert --(°C.)--.

Signed and Sealed this

First Day of April, 1997

Attest:

BRUCE LEHMAN

Attesting Officer

Commissioner of Patents and Trademarks